United States Patent [19]

Hunt, III et al.

[11] Patent Number: 4,982,791
[45] Date of Patent: Jan. 8, 1991

[54] METHOD TO REDUCE MOVEMENT OF A CPF DEVICE VIA A DRAG-REDUCING FLUID TAMP

[75] Inventors: William C. Hunt, III, Farmers Branch; Craig H. Phelps, Carrollton, both of Tex.

[73] Assignee: Mobil Oil Corporation, Fairfax, Va.

[21] Appl. No.: 459,116

[22] Filed: Dec. 29, 1989

[51] Int. Cl.⁵ ............................................. E21B 43/263
[52] U.S. Cl. ...................................... 166/299; 166/308
[58] Field of Search .................. 166/299, 300, 308, 63, 166/177; 299/13

[56] References Cited

U.S. PATENT DOCUMENTS

| | | | |
|---|---|---|---|
| 2,676,662 | 4/1954 | Ritzmann | 166/299 |
| 3,642,068 | 2/1972 | Fitch et al. | 166/307 |
| 4,039,030 | 8/1977 | Godfrey et al. | 166/299 |
| 4,530,396 | 7/1985 | Mohaupt | 166/63 |
| 4,683,951 | 8/1987 | Pathak et al. | 166/299 X |
| 4,714,114 | 12/1987 | Jones | 166/308 X |
| 4,751,966 | 6/1988 | Jones | 166/299 |

Primary Examiner—George A. Suchfield
Attorney, Agent, or Firm—Alexander J. McKillop; Charles J. Speciale; Charles A. Malone

[57] ABSTRACT

A method for minimizing damage to downhole equipment utilized in controlled pulse fracturing (CPF) where a drag reducing fluid tamp is used. Said tamp has a viscosity sufficient to reduce the flowing pressure drop thereby diminishing frictional forces along fluid/solid interfaces. The CPF device is submersed in said tamp. Upon ignition of a CPF device, the upwardly traveling pressure forces the tamp of drag-reducing characteristics to pass the downhole equipment thereby minimizing tool and equipment damage. Afterwards, the pressure is allowed to leak off slowly into the formation.

7 Claims, 1 Drawing Sheet

METHOD TO REDUCE MOVEMENT OF A CPF DEVICE VIA A DRAG-REDUCING FLUID TAMP

FIELD OF THE INVENTION

This invention is directed to a method for minimizing damage to downhole equipment which is utilized during controlled pulse or high energy fracturing ("CPF"). More specifically, it is directed to the use of a drag-reducing tamp which diminishes the friction on said equipment.

BACKGROUND OF THE INVENTION

Stimulation of wells through mechanical fracturing can be accomplished by a method known as controlled pulse fracturing or high energy gas fracturing. A good description of this method appears in an article by Cuderman, J. F., entitled "High Energy Gas Fracturing Development," Sandia National Laboratories, SAND 83-2137, October 1983. Using this method enables the multiple fracturing of a formation or reservoir in a radial manner which increases the possibility of contacting a natural fracture. In the practice of this method, a canister or molded body containing a propellant is suspended into a wellbore. This canister is placed downhole next to the oil or hydrocarbonaceous fluid productive interval.

The propellant in the canister or molded body can belong to the modified nitrocellulose or the modified and unmodified nitroamine propellant class. Suitable solid propellants capable of being utilized include a double-based propellant known as M-5. It contains nitroglycerine and nitrocellulose. Another suitable propellant is a composite propellant which contains ammonium perchlorate in a rubberized binder. The composite propellant is known as HXP-100 and is purchasable from the Holex Corporation of Hollister, Calif. M-5 and HXP-100 propellants are disclosed in U.S. Pat. No. 4,039,030 issued to Godfrey et al. which is hereby incorporated by reference.

After placing the propellant means for creating multiple fractures into a canister and suspending it downhole near all the oil or hydrocarbonaceous fluid productive interval, it is ignited. Ignition of the propellant means for creating the multiple fractures causes the generation of heat and gas pressure. To contain the generated propellant energy within the wellbore and formation, an aggregate stem, generally composed of cement, is placed above the canister or molded body containing the propellant thereby sealing the wellbore. The canister suspension and ignition means passes through the aggregate stem.

After ignition of the propellant means it is difficult to remove the aggregate stem, which often has to be drilled out. When removing the aggregate stem, the suspension means, generally a cable, and the ignition means, along with remnants of the canister which previously contained the propellant, frequently fall into the wellbore. This debris may interfere with production of hydrocarbonaceous fluids from the formation. Drilling out the aggregate often damages the wellbore and formation.

Therefore, what is needed is a method to reduce the vertical drag on downhole equipment used during a CPF operation so as to avoid damaging said equipment and formation.

SUMMARY OF THE INVENTION

This invention is directed to a method for reducing the flowing pressure drop by diminishing the frictional forces along fluid/solid interfaces within a wellbore flow system during a CPF operation. To accomplish this, a canister or molded body containing a propellant is suspended in an uncomplexed ungelled polymer fluid within a wellbore near the formation's productive interval. The height of said fluid within said wellbore is sufficient to contain energy released from said propellant. The fluid contains a polymer in an amount of about 1 ppm to about 10,000 ppm which is sufficient to reduce frictional forces along fluid/solid interfaces within the wellbore.

Afterwards, the propellant is ignited thereby causing the generation of energy and pressure sufficient in combination with said polymer fluid to initiate more than two radial fractures which are extended. During the sudden movement of the fluid following propellant ignition, the reduced frictional forces imported by the polymer fluid on the wireline, result in minimizing upward tool movement and lessening tool damage.

After ignition, and when conditions in the wellbore and formation have reached the desired level of stability, said liquid can be removed.

It is therefore an object of this invention to minimize equipment damage following a CPF treatment through use of a drag-reducing fluid tamp which reduces movement of the CPF tool and wireline.

It is still another object of this invention to use inexpensive polymers in substantially dilute concentrations to reduce drag on CPF downhole equipment.

It is a still yet further object of this invention to provide for a drag reduction fluid which can be used in either an aqueous or an oleic medium.

It is an even still yet further object of this invention to provide for an oil-based tamp fluid so as to avoid damage to a water sensitive reservoir or formation.

DESCRIPTION OF THE PREFERRED EMBODIMENTS

Figure 1:
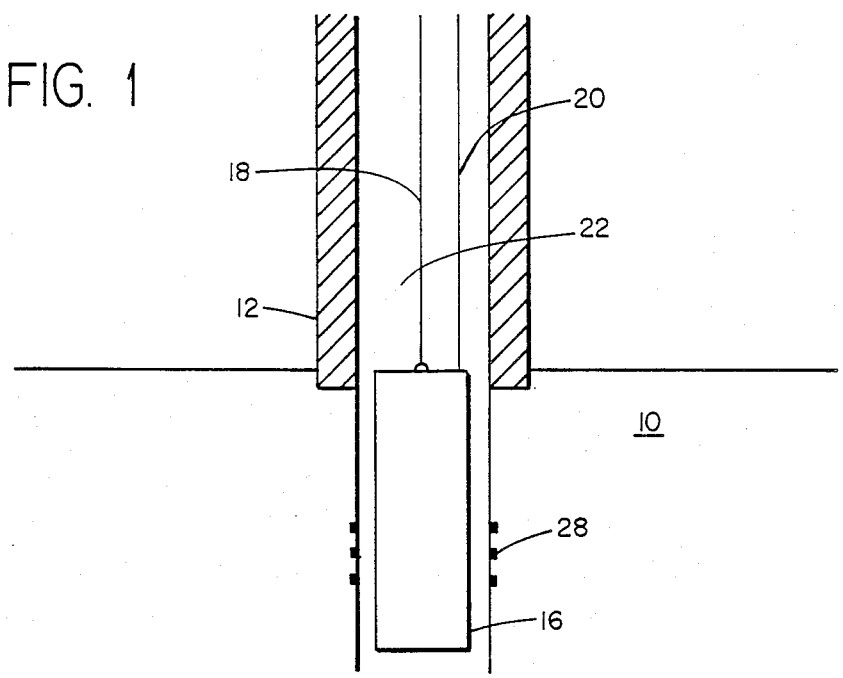
FIG. 1 is a graphic representation of a tamp fluid and canister containing the propellant before ignition.

In the practice of this invention, referring to FIG. 1, a canister 16 or molded tool body containing a propellant is placed into a wellbore 12 which penetrates a hydrocarbonaceous fluid producing formation 10 near the formation's productive interval. Wellbore 12 contains perforations 28 which communicate with the formation's productive interval. Canister 16 or molded tool body is suspended into wellbore 12 in close proximity to the productive interval via a retrieval means, which generally will be a cable 18. A fluid 22 is directed into wellbore 12 thereby immersing canister 16 for some vertical distance above the tool. Fluid 22 in wellbore 12 is of a height sufficient to balance the pressure in formation 10. Generally, this height will be at least about 500 feet above the tool. Wellbore 12 is thereby filled with fluid 22 above the tool. When filled in this manner, fluid 22 serves as a tamp for the propellant contained in canister 16. In order to ignite the propellant contained in the canister 16 or molded tool, a means for igniting the propellant is connected to the tool. Canister 16 or the molded tool will be collectively referred to as a propellant housing means. The other end of the means for ignition is connected or affixed to a location at or above ground level above wellbore 12. Said means for ignition will generally be a conduit 20 containing an electrical wire which wire can be used to generate an electrical spark within canister 16 containing the propellant. Both retrieval means, 18 and ignition means 20 proceed to the surface and through the cap (not shown) on wellbore 12.

Upon ignition of the propellant, heat and pressure are released within wellbore 12. The sudden movement of fluid 22 following the ignition of the propellant tends to drive cable 18 and the remnant of canister 16 upwards. However, the characteristics of fluid 22 are such that compared to conventional tamp fluids containing no polymer, it reduces the frictional forces which tend to drive cable 18 and canister remnant 16 upwards. Since substantially less movement is experienced by cable 18 and canister 16, damage to this equipment is lessened.

Polymers which can be used to make fluid 22 can be made from solutions of xanthan gum, guar gum, hydroxycellulose and its derivatives, poly(ethylene oxide), polyisobutylene, polymethylmethacrylate, polyacrylamide, carboxymethycellulose, poly(acrylic acid), potassium polyphosphate, polystyrene and mixtures of the above. The concentration of the polymers used herein should be from about 1 to about 10,000 ppm. Drag reduction can be obtained in both aqueous and oleic or oil media. In lieu of the aqueous solutions, oil-based fluids can be used if the reservoir is water sensitive. U.S. Pat. No. 4,751,966 mentions the use of a pumpable gel for use in increasing the vertical drag. This patent is hereby incorporated by reference herein.

Polymers particularly useful in oil based applications include polyisobutylene, polymethylmethacrylate and polystyrene. These polymers can be used in a concentration of about 10 to about 10,000 ppm. The preferred concentrations of polymer are: polyethylene oxide, about 10 to about 500 ppm; polymethylmetacrylate, about 10 to about 500 ppm; polyisobutylene, about 10 to about 1,000 ppm; and polystyrene, about 100 to about 2,000 ppm.

The concentration of polymers utilized should be adjusted to produce the maximum drag-reducing effect for the flow conditions anticipated in a specific CPF application. Therefore, the concentration of polymer utilized will be about 1 to about 1,000 for biopolymers such as xanthan, carboxymethycellulose, and guar gum. Of course, as will be understood by those skilled in the art, the concentration of polymer will depend upon the composition of the polymer utilized. Any concentration of polymer used should impart a drag reducing effect along the fluid/solid interfaces in a well flow system where CPF downhole equipment is utilized. Any increase in concentration of polymer sufficient to impart an increase in vertical drag should be avoided.

Figure 2:
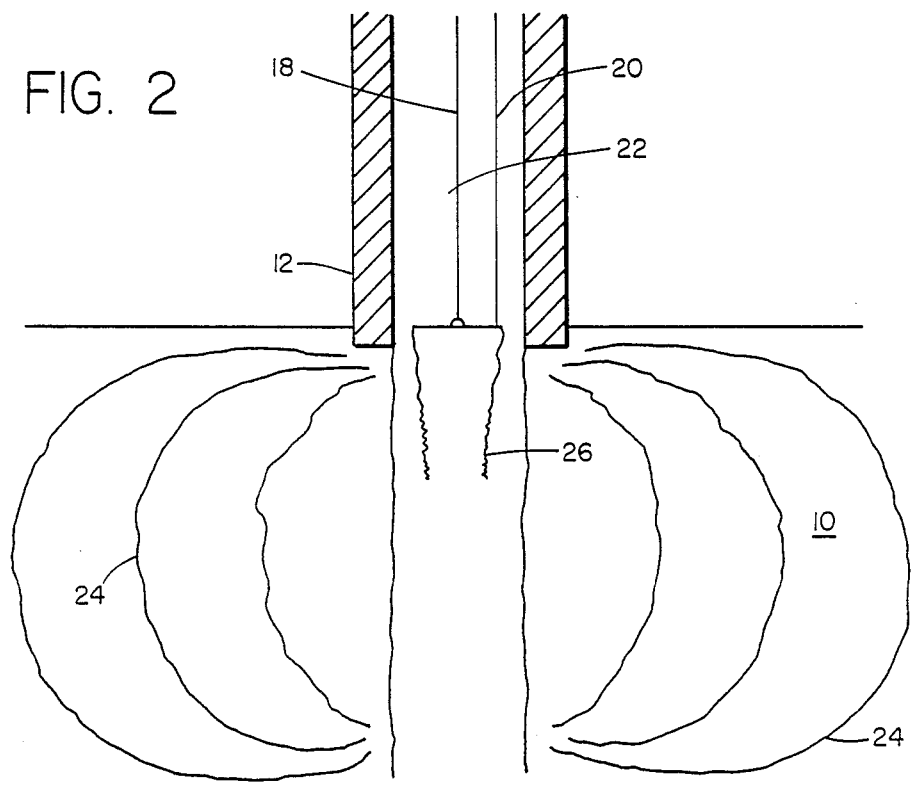
FIG. 2 is a graphic representation of a tamp fluid and canister containing the propellant after ignition.

Once ignited, heat and pressure created by the propellant causes a total or partial disintegration of canister 26 which contained the propellant. However, as is shown in FIG. 2, cable 18 and ignition line 20 remain intact having sustained minimum damage. Once the pressure on wellbore 12 has dissipated, retrieval cable 18, and ignition line 20, along with remnants of canister 26 are removed from the wellbore.

Fluid 22, after ignition, flows into wellbore 12 where it can be removed by any suitable physical means such as pumping to the surface. After any debris and viscous fluid have been removed from the wellbore, hydrocarbonaceous fluids can be produced from a formation when the created fractures intersect a natural hydrocarbonaceous fluid containing fracture.

Although the present invention has been described with preferred embodiments, it is to be understood that modifications and variations may be resorted to without departing from the spirit and scope of this invention as those skilled in the art will readily understand. Such modifications and variations are considered to be within the purview and scope of the appended claims.

What is claimed is:

1. A method for reducing drag forces on a suspended propellant housing means and a propellant igniting means within a wellbore during controlled pulse fracturing comprising:
    (a) directing an uncomplexed, ungelled polymer fluid into a wellbore thereby making a fluid of a height sufficient to submerse said housing means and igniting means where said fluid is of a viscosity sufficient to flow freely past said housing means and the igniting means;
    (b) suspending said housing means with propellant therein and the igniting means into said wellbore and fluid near a formation's productive interval; and
    (c) igniting said propellant thereby generating energy and pressure sufficient to initiate simultaneous multiple vertical fractures while freely flowing said fluid upwardly in said wellbore which minimizes damage to said housing means and propellant igniting means due to a drag reducing effect along the fluid/solid interfaces in the wellbore's flow system resultant from the concentration of polymer utilized.

2. The method as recited in claim 1 where said fluid is made from a polymer selected from a member of the family consisting of xanthan, alcaligens, guar gum, polyacrylamide, carboxymethylcellulose, poly(ethylene oxide), polyisobutylene, polymethylmethacrylate, poly(acrylic acid), potassium polyphosphate and polystyrene.

3. The method as recited in claim 1 where said fluid contains a polymer in a concentration of about 1 ppm to about 10,000 ppm.

4. The method as recited in claim 1 where the fluid is an aqueous medium and the polymer is a member selected from the family consisting of xanthan gum, guar gum, hydroxycellulose poly(ethylene oxide), polyacrylamide, carboxymethylcellulose, poly(acrylic acid), and potassium polyphosphate.

5. The method as recited in claim 1 where the fluid is an oleic or oil medium and the polymer is a member selected from the group consisting of polyisobutylene, polymethylmethacrylate, and polystyrene.

6. The method as recited in claim 1 where the fluid is an oleic or oil medium and the polymer is a member selected from the group consisting of polyisobutylene, polymethylmethacrylate, and polystyrene which polymer is contained in said liquid in an amount from about 10 to about 5,000 ppm.

7. The method as recited in claim 1 where said propellant housing means is a canister.

* * * * *